(12) United States Patent
Stokes

(10) Patent No.: US 6,345,128 B1
(45) Date of Patent: *Feb. 5, 2002

(54) GENERATION OF TONE REPRODUCTION CURVES USING PSYCHOPHYSICAL DATA

(75) Inventor: Michael Stokes, Cupertino, CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,426

(22) Filed: Oct. 22, 1997

Related U.S. Application Data

(63) Continuation of application No. 08/307,426, filed on Sep. 19, 1994, now abandoned.

(51) Int. Cl.[7] .................................................. G06K 9/40
(52) U.S. Cl. ........................................ 382/254; 382/100
(58) Field of Search ................................ 382/169, 274, 382/254, 100; 348/254; 358/455, 522

(56) References Cited

U.S. PATENT DOCUMENTS

| | | | | |
|---|---|---|---|---|
| 4,309,496 A | * | 1/1982 | Miller ........................ | 356/419 |
| 4,500,919 A | * | 2/1985 | Schreiber ................... | 358/518 |
| 4,654,722 A | * | 3/1987 | Alkofer ...................... | 358/455 |
| 4,731,671 A | * | 3/1988 | Alkofer ...................... | 358/455 |
| 4,751,503 A | * | 6/1988 | Kermisch ................... | 345/157 |
| 4,805,013 A | | 2/1989 | Dei et al. .................... | 358/523 |
| 5,079,698 A | * | 1/1992 | Grenier et al. .............. | 382/128 |
| 5,123,060 A | * | 6/1992 | Cho et al. ................... | 382/274 |
| 5,250,959 A | | 10/1993 | Yamada et al. ............. | 358/298 |
| 5,287,418 A | * | 2/1994 | Kishida ...................... | 382/169 |
| 5,339,176 A | * | 8/1994 | Smilansky et al. ......... | 358/504 |
| 5,418,895 A | * | 5/1995 | Lee ............................. | 382/168 |
| 5,450,216 A | * | 9/1995 | Kasson ....................... | 382/167 |
| 5,450,502 A | * | 9/1995 | Eschbach et al. ........... | 382/274 |
| 5,504,583 A | * | 4/1996 | Jamzadeh et al. .......... | 382/319 |

FOREIGN PATENT DOCUMENTS

| | | |
|---|---|---|
| WO | WO81/00007 | 1/1981 |
| WO | WO92/05470 | 4/1992 |

OTHER PUBLICATIONS

"Optical Radiation Measurements", Bartleson, C. James, et al., vol. 5, Visual Measurements, Academic Press, Inc., 1984, pp. 455–467.

"Colormetric Tolerances of Digital Images", Stokes, Mike, Rochester Institute of Technology, Aug. 1991, 1–186.

* cited by examiner

*Primary Examiner*—Yon J. Couso
(74) *Attorney, Agent, or Firm*—Burns Doane Swecker & Mathis, L.L.P.

(57) ABSTRACT

The present invention is directed to producing and reproducing an image using a tone reproduction curve which has been selected based on statistical evaluation of psychophysical data, such as psychophysically quantified subjective judgements. By providing a controlled acquisition and evaluation of psychophysical data to select a tone reproduction curve, visually improved imagery can be assured. Further, once a procedure for controlled acquisition and statistical evaluation of psychophysical data has been established for a given environment, lesser skilled technicians can be used to carry out selection of a tone reproduction curve.

30 Claims, 2 Drawing Sheets

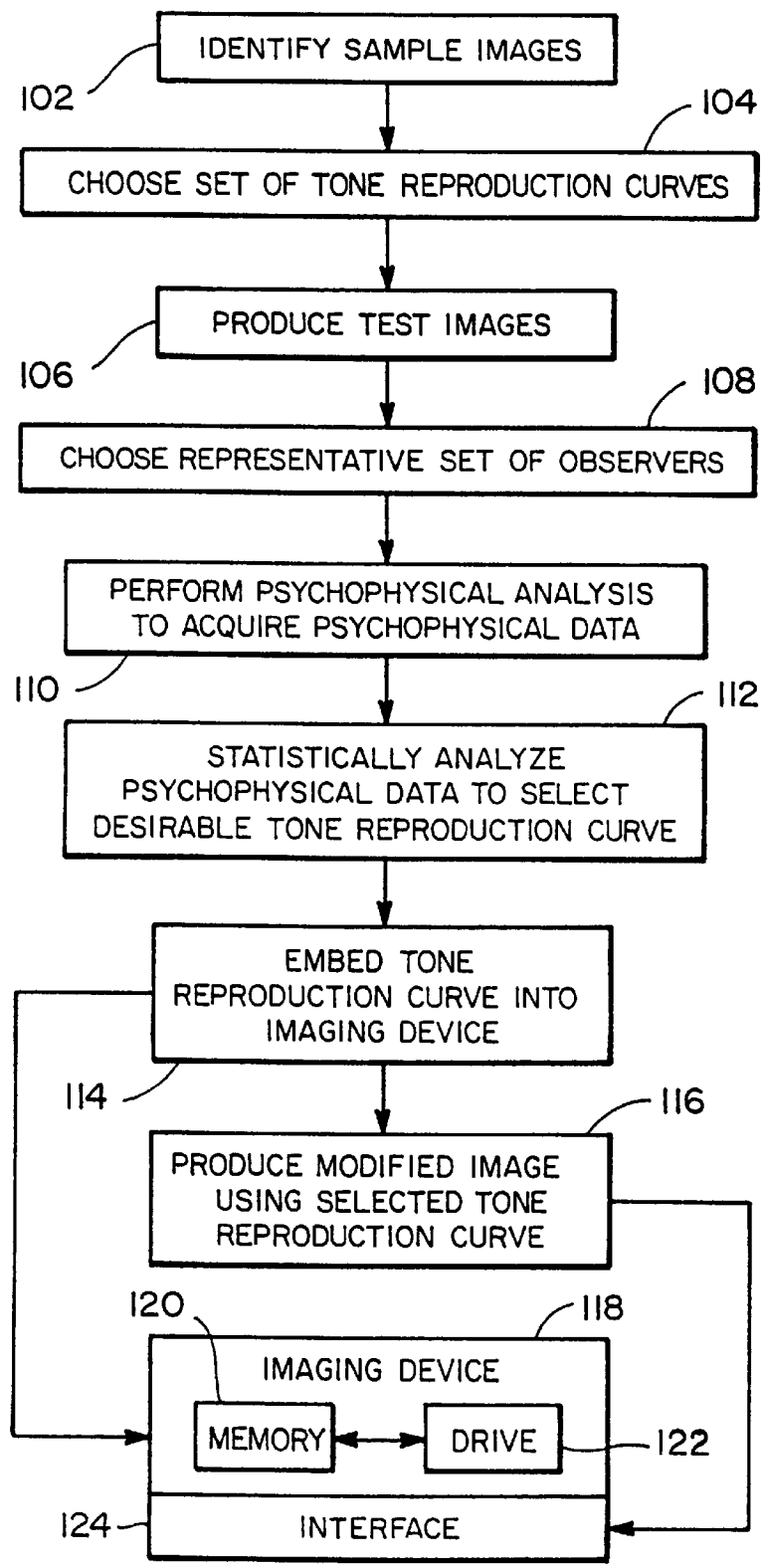
FIG_1

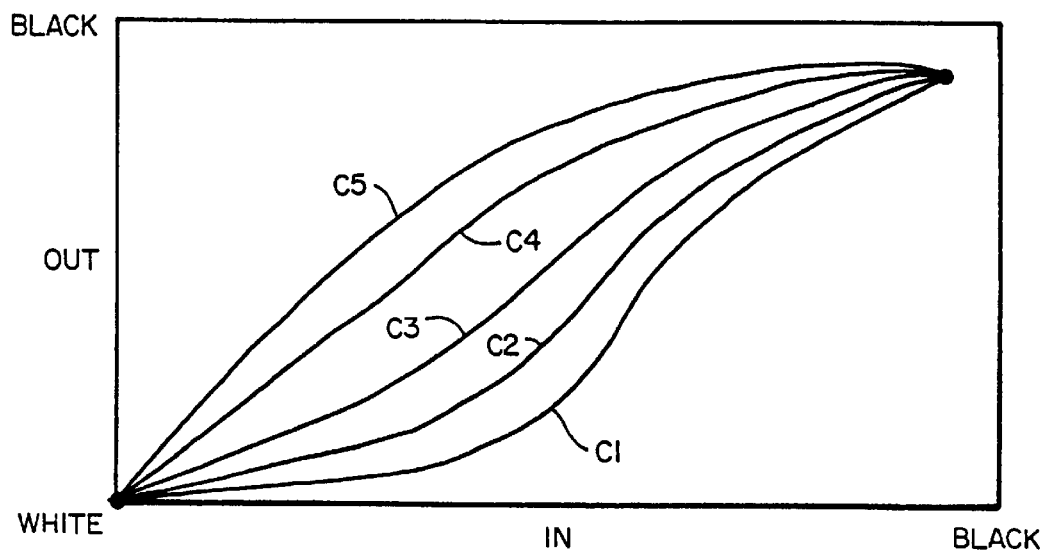
FIG_2
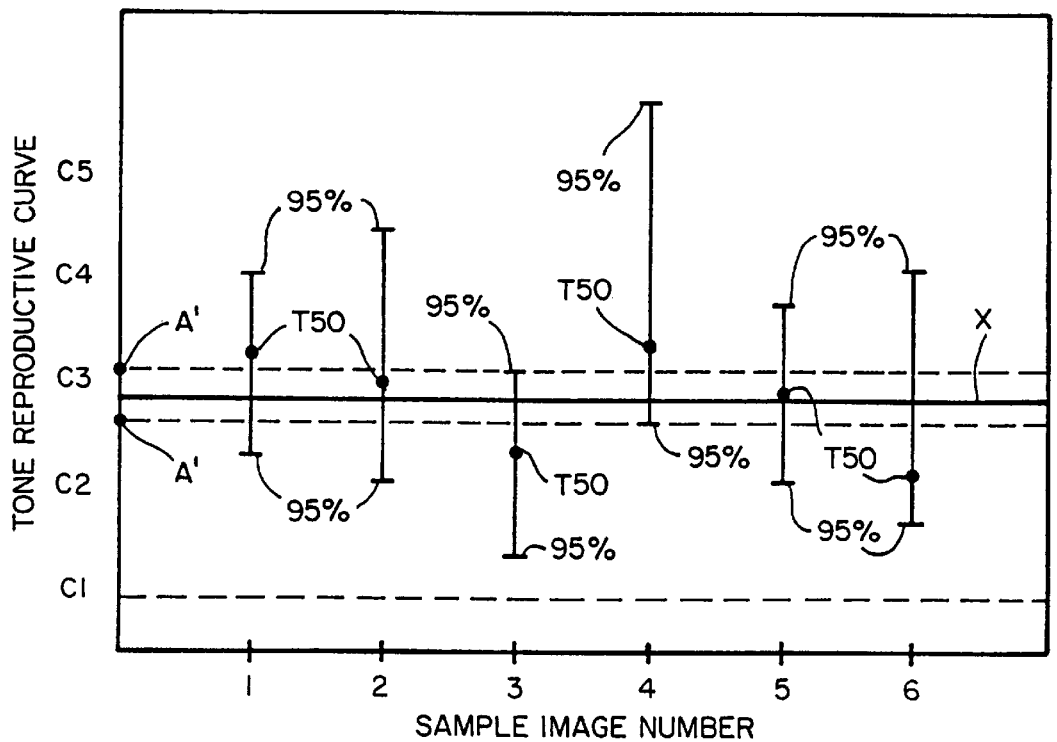
FIG_3

GENERATION OF TONE REPRODUCTION CURVES USING PSYCHOPHYSICAL DATA

This application is a continuation, of application Ser. No. 08/307,426, filed Sep. 19. 1994 now abandoned.

BACKGROUND OF THE INVENTION

1. Field of Invention

The present invention relates generally to production and reproduction of images, and more particularly, to enhancing the quality of images produced by using a tone reproduction curve which has been selected on the basis of psychophysical data.

2. State of the Art

In the production and reproduction of imagery using devices such as video displays and printing devices, image analysis techniques are typically relied upon to improve quality. For example, image acceptability is often evaluated with respect to a reference image in a three dimensional color space, wherein a location of each color is defined by three dimensions. One such color space is the internationally standardized CIELAB LCh color space, wherein each color location is defined by its lightness, chroma and hue angles. Image evaluation in a given color space can be used to provide a tone reproduction curve that is embedded in an image production device to enhance the quality of resultant images.

Tone reproduction curves constitute transfer functions for modifying one or more dimensions of an image which is to be produced. For example, linear or nonlinear transfer functions can be used to modify the lightness of an image.

One transfer function used as a tone reproduction curve is the multiplicative factor transfer function. With the multiplicative factor transfer function, the lightness of an input image is multiplied by a constant to provide an output image with a modified lightness. A tone reproduction table can then be created using the multiplicative factor, and stored as a look-up table in an image production device.

The tone reproduction curve modifies lightness of the output image to compensate for distortion which results from, for example, characteristics of the display or printer, a printing substrate, printing ink characteristics and so forth. If left uncorrected, the unmodified lightness could result in output image which appears too dark, too shadowed or which lacks adequate contrast.

Tone reproduction curves for correcting lightness have achieved widespread use in, for example, gray scale printers. However, there is currently no efficient and highly accurate technique available for evaluating plural tone reproduction curves in an effort to select the one curve which will produce output images with the most visually pleasing results. Rather, a tone reproduction curve is typically selected by comparing test images (which have been produced using the curve) to known reference images. Discrepancies are then evaluated on the basis of half toning concerns such as dot gain, or on the basis of predetermined measurement constraints, such as an ink density (for example, an effort can be made to linearize the dot gain or density of a gray scale which has been printed). Other techniques for selecting a tone reproduction curve rely on uncontrolled, ad hoc assessment of test images to identify a tone reproduction curve which appears to provide a visually pleasing result.

Thus, techniques for selecting a tone reproduction curve require some form of matching to a predetermined constraint, (such as linearizing a printed gray scale), or involve uncontrolled, ad hoc assessment of test images. However, these techniques fail to assure that the subjectively best tone reproduction curve will be selected. Further, to provide at least a minimum level of accuracy, these techniques require using a highly skilled engineer to select the tone reproduction curve and develop an associated tone reproduction table.

SUMMARY OF THE INVENTION

Accordingly, the present invention is directed to producing or reproducing an image using a tone reproduction curve which has been selected on the basis of a statistical evaluation of psychophysical data, such as psychophysically quantified, subjective judgements. By providing a controlled acquisition and evaluation of psychophysical data to select a tone reproduction curve, improved imagery can be assured. Further, once a procedure for controlled acquisition and evaluation of psychophysical data has been established, lesser skilled technicians can be used to carry out selection of a tone reproduction curve.

Exemplary embodiments are directed to a method for producing an image comprising the steps of: selecting at least one tone reproduction curve by statistically analyzing psychophysical data acquired using a plurality of tone reproduction curves, and producing the image using the at least one tone reproduction curve.

Further, exemplary embodiments are directed to an apparatus for producing an image comprising means for storing at least one tone reproduction curve having a parameter based on statistical analysis of psychophysical data acquired using plural tone reproduction curves, and means for producing an image using the at least one tone reproduction curve.

BRIEF DESCRIPTION OF THE DRAWINGS

FIG. 1 illustrates an exemplary embodiment of a method and apparatus in accordance with the present invention;

FIG. 2 illustrates a plurality of tone reproduction curves which have been produced using a sigmoidal transfer function; and FIG. 3 illustrates an exemplary chart produced in response to a statistical evaluation of psychophysical data that has been acquired using the tone reproduction curves of FIG. 2.

DETAILED DESCRIPTION OF THE PREFERRED EMBODIMENTS

FIG. 1 illustrates an exemplary embodiment of a method for producing an image by selecting at least one tone reproduction curve in accordance with the present invention. To achieve the highest quality in image production, the most desirable tone reproduction curve is selected on the basis of end users' preferences. The end user is, for example, the purchaser of a printing device which is to incorporate the selected tone reproduction curve. These end users' preferences are quantified as psychophysical data which has been acquired using a set of different tone reproduction curves.

More particularly, the step of selecting the most desirable tone reproduction curve is initiated by identifying a set of sample images representative of typical images to be produced by the end user (block 102). In selecting the sample images to be used, any number of concerns regarding typical images to be produced can be taken into account. Concerns which can be used to select the sample images include: scene content dependence (for example, significant features of a scene which are typical in images to be produced in the industry of the end user), perceived object distance within the image, and overall tonal levels of typical images to be produced. Although scene content will not significantly affect end user preference, the selection of a few types of scene content in well-balanced images (for example, professional quality prints) will provide a sufficiently broad foundation of scene content for acquiring reliable psychophysical data.

The number of different sample images which can be used in acquiring the psychophysical data can be varied. For example, six or fewer different sample images can typically be chosen. Where different sample images are used, the images should be selected with the different concerns being kept in mind. For example, where six sample images are used, they can be selected to include: three different levels of scene content, such as: (1) man-made objects; (2) people; and (3) natural scenes, two different levels of perceived object distance; and two different levels of tonal content.

The quality of the sample images should also be taken into consideration, with the highest quality sample images being selected whenever possible. In this regard, professional composition, lighting and exposure range of original images can be taken into consideration along with the previously mentioned concerns of industry use, scene content, object distance and overall tonal level. For example, professional high quality originals can be scanned at a resolution which corresponds to that of the image production device of the end use, and then color corrected on a reference monitor to provide sample images which match the original prints.

Having chosen a set of sample images, the step of selecting the most desirable tone reproduction curve includes a step of choosing a plurality of tone reproduction curves that will be used to acquire the psychophysical data (block 104). The set of tone reproduction curves chosen for the acquisition of psychophysical data can include tone reproduction curves having known or surmised characteristics. For example, a transfer function deemed most desirable for a previous set of sample images (that is, sample images which were similar to the sample images currently being processed) can be used as one of the plural tone reproduction curves. Additional tone reproduction curves can then be generated by varying one or more parameters of the transfer function. Alternately, the plurality of tone reproduction curves can be randomly chosen, or any mix of tone reproduction curves having known, surmised and random characteristics can be used.

As mentioned previously, a tone reproduction curve, can be considered a transfer function which translates an input image into an output image, such as an output image which is more visually pleasing to end users. Two fundamental transfer functions which have been used to simulate common industry process transformation, for contrast control and lightness control (also known as gamma control) have mathematical constructs which correspond to (1) a power function; and (2) a sigmoidal function, respectively. The mathematical construct of a power function can be represented:

$$\text{Output} = \text{Input}^{Power}$$

The sigmoidal function can be implemented with a mathematical construct that corresponds to a combination of two power function, as follows:

If Input <½ then Output=(Input·2)$^{Power}$/2,

Otherwise, Output=[[(Input·2)−1]$^{1/Power}$/2]+1/2 wherein "Input" corresponds, for example, to an input lightness value of an image, and "Output" corresponds to a modified lightness of the image.

Of course other transfer functions exist which can be used in connection with exemplary embodiments. Two such alternate transfer functions have mathematical constructs which correspond to: (1) an additive offset; and (2) a multiplicative offset. Those skilled in the art will therefore appreciate that the present invention is not limited to any particular type of transfer function, but rather can be used in accordance with any type of transfer function suitable for implementing a tone production curve.

The choosing of the set of tone reproduction curves further includes steps of selecting a transfer function as a first tone reproduction curve (such as a transfer function having one of the mathematical constructs described above), and then varying a parameter of the transfer function to generate at least one additional tone reproduction curve. For example, a set of tone reproduction curves, can be established by selecting the sigmoidal function, and then incrementally varying the exponent to provide plural transfer functions, such as the transfer functions represented as tone reproduction curves C1 to C5 in FIG. 2.

Alternately, the set of tone reproduction curves can be produced by selecting a first transfer function as a first tone reproduction curve, and the selecting a second transfer function, having a mathematical construct which differs from that of the first transfer function, as a second tone reproduction curve. For example, the set of tone reproduction curves can include one or more curves defined by the power function, and one or more curves defined by the sigmoidal function.

Having chosen a set of sample images and a set of tone reproduction curves, the selection of the most desirable tone reproduction curve can be performed by generating a set of test images using the sample images and the plurality of tone reproduction curves (block 106). The step of generating test images can include reproducing each of the sample images using each of the plurality of tone reproduction curves. In preparing the test images, some blank trials wherein no manipulation of the sample image occurred can also be included for each sample image to verify the integrity of psychophysical data acquired.

The number of tone reproduction curves used to produce the test images can be determined using a pilot experiment. For example, a number of incremental variations of a parameter in a transfer function having a given mathematical construct (such as incremental variations of the exponent in the power function) can be increased in a pilot experiment until optimum acceptability data is obtained. As referenced herein, optimum acceptability data refers to psychophysical data which reflects that differences were perceived in test images produced from a sample image using two different transfer functions (such as two power functions implemented with a different exponent).

For example, in establishing a set of tone reproduction curves, a test image produced by each transfer function selected can be compared during the pilot experiment to ensure perceptible differences exist. Alternately, test images can be prepared and viewed during a pilot experiment to provide a crude identification of boundaries for transfer function parameters, between which the most desirable tone reproduction curve can be assured of falling. For example, an initial transfer function surmised to be close to a transfer curve which will produce a suitable image can be selected; afterwards an extreme adjustment of a transfer function parameter (such as the exponent of a power function) can be used to provide transfer functions in both directions (that is, high contrast and low contrast) which will produce a perceivable difference in the output image (relative to an output image produced by the initial transfer function). Plural transfer functions can then be produced by varying the transfer function parameter between the extreme parameter boundaries.

Psychophysical data can next be acquired by performing a psychophysical analysis of the test images. The psychophysical analysis involves using plural observers for comparing the test images with one another to obtain the psychophysical data.

A psychophysical analysis of images is described in applicant's thesis, entitled "Colorimetric Tolerances of Digital Images", Rochester Institute of Technology August 1991. This thesis is directed to determining colorimetric tolerances; that is, the extent to which a scene in an image can be manipulated using different transfer functions before such manipulation become perceptible to the human eye. As disclosed in the thesis, thirty-two observers judged six typical photographic scenes displayed on a monitor. Each of the six scenes were manipulated using ten transfer functions (that is, linear and non-linear functions) in the color dimensions of lightness, chroma and hue angle. Image preferences for each scene, which were identified by the observers using a paired comparison of images, were acquired as psychophysical data. Colorimetric tolerances were then determined by statistical analysis of the psychophysical data. Perceptibility tolerances for each of the scenes were correlated to each of the linear and non-linear functions under consideration on pages 52–73 of the thesis.

In accordance with exemplary embodiments of the present invention, a psychophysical analysis of data is used whereby test images produced using plural tone reproduction curves (that is, digitized test images which have been produced using any imaging device which is to be used in the end users' industry) are compared against one another to provide psychophysical data. The psychophysical data is then statistically analyzed to ascertain the most desirable tone reproduction curve for the end user's industry.

The performance of a psychophysical analysis in accordance with the present invention involves selecting a number of observers (block 108). In accordance with exemplary embodiments, the number of observers can be equal to or greater than twice the number of tone reproduction curves used to generate the test images. For example, the number of observers used to analyze six sample images and five tone reproduction curves can range from, for example, 10 to 30 observers. Where the number of observers is increased above 30, statistical results do not significantly change. To optimize results, the observers should be selected from the projected end user industry, but this is not necessary. Further, the observers should be color normal observers ranging in age from, for example, 20 to 55 with varied color analysis experience, and be tested for color vision using simple color blindness test charts.

The observers should be placed within a controlled environment which accurately simulates typical viewing in the end user industry. Conditions of the controlled environment which can be taken into consideration include variables such as ambient white point (for example, use of fluorescent lighting, incandescent lighting or daylight), lightness level of the viewing environment, surround color (that is, the background used to display the test images, such as a medium gray) and ambient temperature.

Having produced the test images from the set of tone reproduction curves and sample images, a set of test image data is created which includes each of the test images. Further, the test image data includes a correlation of the test image to the transfer function which created the test image. Such a correlation is needed so that image preferences of the observers can be related to the transfer function used to create the preferred test images.

After accumulating all test image data, images are subjectively judged by each observer to acquire psychophysical data (block 110). Test conditions similar to those described in the aforementioned thesis with respect to a determination of perceptibility tolerances can be used in accordance with exemplary embodiments of the present invention. In accordance with an exemplary embodiment of the present invention, pairs of the test images can be judged during a one-hour long observation period. The time associated with this observation period is limited by a concern that too long of a period will result in exhaustion of the observers.

Where the approximate size of a test image is 3 to 8.5 inches wide by 5 to 11 inches long, respectively (with width and length being interchangeable), each observer can be positioned approximately 18 inches to 24 inches from each pair of test images. Further, the test images can be placed at an angle (such as approximately forty-five degrees) to minimize glare.

In a paired comparison test, each observer views two test images which have been overlaid on a background (for example, a medium gray background). A neutral display surface should be used as the background to maintain consistency with the end user environment. For each pair of test images observed, the observer must choose one of the two images as a preferred image, and a selection must be made even in cases where the observer can perceive no difference between the two images. To ensure proper test control, a set of instructions can be read to each observer to ensure that the observer will always choose one of the two images as a preferred image even if the observer must guess between the two. Further, each observer should be instructed to select a preferred image based on an overall judgement as to which of the two test images is preferred, and should not focus on comparing small image areas. The observers should wait a few seconds after each judgement before continuing to the next pair of images.

In accordance with an exemplary embodiment wherein six sample images are selected and wherein five tone reproduction curves are used to generate the test images, a total of 30 different test images can be generated. Assuming that 15 observers are selected, each of the 15 observers will view the test images in pairs. Given that there are six sample images and 5 tone reproduction curves, and taking into consideration that different sample images produced by the same tone reproduction curve can be compared against one another, a total of: $(6 \times 5^2)$, or 150 pairs of test images can be analyzed. Each of the pairs of test images are presented to the observer in a predetermined randomized order so that each test image and associated tone reproduction curve used to produce the test image can be correlated to the observers' preference. As each observer goes through each pair of test images, a selection of the most desirable image for each pair is indicated by choosing either the image to the left or the image to the right. The observer continues this process until all pairs of test images have been compared and the preferred test images for each pair have been selected.

Once each observer has viewed all images, the test image/transfer function preferred by each observer for each of the 150 comparisons is accumulated as the psychophysical data. Because two images are viewed at a time and because each observer is required to select one of the two images as a preferred image, the foregoing data acquisition technique constitutes a forced choice paired comparison. However, those skilled in the art will appreciate that psychophysical data can be acquired using any number of well known psychophysical data acquisition techniques, and the present invention is not limited to the use of forced choice paired comparison. For example, in accordance with another exemplary embodiment, the acquisition of psychophysical data can be achieved using a paired comparison without forced choice. Alternately, a rating scale technique can be used whereby each observer views each test image individually and provides a rating of from 1 to 10 for each test image, with 1 being the least desirable and 10 being most desirable. Afterwards, the ratings for all of the test images can be accumulated and correlated to the tone reproduction curves used to produce the test images.

Having acquired the psychophysical data, a statistical analysis of the results obtained using the test images can be performed for each sample image to select the most desirable tone reproduction curve for the end user's industry (block 112). Generally speaking, the psychophysical data should be analyzed for goodness of fit, acceptability tolerances and uncertainty estimates for these tolerances. In accordance with exemplary embodiments, the statistical analysis used for selecting a desired tone reproduction curve involves deriving a mean tone reproduction curve as the desired tone reproduction curve.

To derive a mean tone reproduction curve, the psychophysical data can be analyzed using a maximum likelihood model which relates the psychophysical data to occurrence probability estimates. One such statistical analysis which can provide such a model is the known probit analysis, described in greater detail in the aforementioned thesis (see Appendix F), the entire contents of this thesis being hereby incorporated by reference in their entirety. The probit analysis is a statistical analysis which can be used to obtain a normal distribution. The maximum likelihood model of the probit analysis can therefore be used to fit the frequency of cumulative observer responses to a cumulative normal distribution. The probit analysis has been shown to provide excellent results in statistically analyzing psychophysical data, as described, for example, in "Probit", by D. J. Finney, Third Edition Cambridge U. Press, Cambridge (1971); a thesis entitled "Visual Determination of Color Differences Using Probit Analysis; Phase II", by L. Reniff, Master's Thesis, Rochester Institute of Technology (1989); and "Performance Testing of Color-Difference Metrics Using a Color Tolerance Data Set" by D. H. Alman, R. S. Burns, and W. A. Larsen, Col. Res. Appl.

The derivation of a mean tone reproduction curve can further include, as mentioned above, an assessment of a fit of the psychophysical data to a cumulative normal distribution. For example, the well known Pearson Chi-Squared test and its associated probability can be used to determine the fit of the acquired psychophysical data to a cumulative normal distribution assumed in conjunction with the aforementioned probit analysis. As referenced herein, the assessment of a goodness of fit provides an assurance that the observers are normally distributed around the mean. If such a normal distribution is not determined to exist, a presumption can be made that some flaw or noise exists in the testing conditions such that the test needs to be re-examined and possibly conducted once again.

The step of deriving a mean tone reproduction curve can further include a step of estimating a tolerance of the psychophysical data using, for example, a median tolerance. With the maximum likelihood model of the probit analysis, estimation of tolerances and uncertainty of these tolerances can be derived, with the most accurate estimate being the median tolerance at a rejection/acceptance probability of 50%. The median tolerance, is illustrated in FIG. 3 as the point "T50", representing a location in the cumulative normal distribution of acquired data for each sample image at which one half of the observers' preferences are above the T50 point and one half of the observers' preferences are below the T50 point.

In deriving a mean tone reproduction curve, an uncertainty of the tolerance can be estimated using fiducial limits obtained using the probit analysis (such as 95% confidence limits). The fiducial limits can be calculated using the probit analysis to produce an estimate of uncertainty for the median tolerance results. Fiducial limits are expressions of the probability that, within a given percentage, the estimate will fall within the specified range. For example, 95% confidence levels define a range within the cumulative normal distribution for each sample image within which 95% of all observations fall. When the model fit is poor, the fiducial limits are infinite in value.

Where a probit analysis is used in conjunction with the Pearson Chi-Squared Test for statistically analyzing the psychophysical data, the known SAS Logistic program can be used to implement the statistical analysis. The SAS logistic program is a computer program which implements the probit analysis and the Pearson Chi-Squired test, and is readily available from, for example, SAS Institute, Inc. of North Carolina. The tolerance mean and fiducial limits of FIG. 3 can therefore be derived using the SAS probit analysis procedure.

When the Pearson Chi-Squared test determines that the probit analysis has not resulted in a cumulative normal distribution having a good fit to the psychophysical data, a regression diagnostic status can be used to eliminate (that is, filter out) anomalous observations. For example, it may be that during entry of the acquired psychophysical data, an errant keystroke resulted in entry of data which is far outside the cumulative normal distribution. Such anomalous data can therefore be eliminated to improve the fit of the cumulative normal distribution of the acquired data.

The SAS Logistic program provides seven regression diagnostic statistics which were developed to identify influential observations. Each of these diagnostic statistics can be tested as a possible filter criterion using experimental results and seeking the lowest Chi-Squared values. Any one of the seven regression diagnostic statistics involved in the SAS Logistic program can be used for filtering out anomalous results. For example, a C diagnostic statistic is included in the SAS Logistic program and can be an effective filter since this statistic corresponds to observations that have undue influence on both individual coefficients and the model fit itself.

While the foregoing discussion of exemplary embodiments has referenced the use of probit analysis, those skilled in the art will appreciate that any number of possible statistical analysis techniques can be used to analyze the psychophysical data in accordance with exemplary embodiments of the present invention. The use of probit analysis is therefore by way of illustration only, and those skilled in the art will readily appreciate different techniques which would be suitable, including techniques such as the use of Z tables as described in the book entitled "Optical Radiation Measurements, Volume 5—Visual Measurements", by Bartleson, C. James and Franc Grum, Rochester Institute of Technology, Rochester, New York, Academic Press, Inc.: 1984 (see, for example, Table 6 on page 461 and table 7 on page 464), the contents of which are hereby incorporated by reference in their entirety.

As a result of the statistical analysis of plural sample images using the plural tone reproduction curves of FIG. 2, the FIG. 3 chart can be formulated using each sample image along the x axis and each tone reproduction curve along the y axis. In preparing the FIG. 3 chart, the tone reproduction curves can be ordered along the y-axis to optimize their normality assumption; that is, curves which result in the production of test images having similar characteristics can be grouped next to one another along the y-axis. Where the set of tone reproduction curves used to produce the test images have a single mathematical construct, the order of the curves can correspond to an incremental progression of the parameter which is modified to establish the set of curves. For example, where each of curves C1 to C5 is a power function having an exponent which varies from 1 to 5, respectively the curves can be ordered according to the incremental progression of the exponents (that is, from C1 to C5).

However where the tone reproduction curves have different mathematical constructs, the integrated area beneath each curve in FIG. 2 can be used to order the curves along the y-axis of FIG. 3 (for example, from the curving having the smallest integral value to that having the largest integral value).

For each sample image, a vertical bar corresponding to a portion of the cumulative normal distribution obtained for each sample image can extend between the fiducial limits included in the FIG. 3 chart. For example, the vertical bar shown for each sample image in FIG. 3 extends from the lower 95% confidence limit to the upper 95% confidence limit. The median tolerance is located at a point along this vertical bar at which half of the test images (that is, test images produced from a given sample image) exist above the point and half exist below the point. The most desirable tone reproduction curve can be selected by passing a horizontal line "X" across the graph and having this horizontal line intersect the median tolerance point for each of the sample images. Because this is an unrealistic case, the most desired tone reproduction curve can be selected by identifying points along the y axis which correspond to the parameter of a transfer function from which the horizontal line "X" can be drawn and intersect the vertical bar for each of the sample images.

For example, if the horizontal line of FIG. 3 intersects the y-axis midway between C2 and C3, then the appropriate weighted average of the two curves can be selected as the most desirable tone reproduction curve. Where all of the tone reproduction curves are of the same mathematical construct, the variable parameter of the most desirable tone reproduction curve can be selected as a point along the y-axis which is intersected by the horizontal line. For example, where C2 is a power function with an exponent of 2 and C3 is a power function with an exponent of three, and assuming the horizontal line "X" intersects the y-axis midway between C2 and C3, the most desirable tone reproduction curve can be considered a power function with an exponent of 2.5. Where the curves C2 and C3 have different mathematical constructs, and the horizontal line intersects the y-axis midway between C2 and C3, the most desirable tone reproduction curve can be determined by calculating, for each input point along the curves C2 and C3, an average output value. The averaged output values can then be used to define the optimal transfer function.

Having selected the most desirable tone reproduction curve using the aforementioned statistical analysis of psychophysical data, an image can be produced using the at least one tone reproduction curve. For example, in accordance with exemplary embodiments, a tone reproduction table (i.e., gamma table) can be formulated using the transfer function associated with the selected tone reproduction curve. This table can then be coded into a printer driver or into a display driver (block 114 of FIG. 1). Subsequently, any images produced by the printer or display will be modified in accordance with the at least one tone reproduction curve selected to be the most desirable tone reproduction curve (block 116).

The foregoing encoding of the at least one tone reproduction curve into a printer or display driver assumes that the results of statistically analyzing the psychophysical data resulted in an acceptable transfer function. However, if the transfer function is at the extreme of a range of parameter values (for example, all transfer functions used in the acquisition of psychophysical data correspond to power functions with difference exponents, and the selected tone reproduction curve corresponds to a transfer function having a parameter at an extreme of the exponent parameter range), a new set of parameters can be derived and the entire process repeated.

The foregoing describes exemplary embodiments of the present invention for obtaining a tone reproduction curve in accordance with the present invention. Those skilled in the art will appreciate that the present invention can also be used to modify an apparatus for producing an image once a desired tone reproduction curve has been ascertained.

In accordance with exemplary embodiments of the present invention, an apparatus 118 (FIG. 1) for producing an image can include a means for storing at least one tone reproduction curve having a parameter based on statistical analysis of psychophysical data acquired using plural tone reproduction curves. Such a means can be any conventional memory device 120 such as a random access memory or a read only memory, wherein transformation values dictated by the most desirable tone reproduction curve are stored as a look-up table. Alternately, the transfer function itself can be stored and used to calculate output values from input image data.

The apparatus for producing an image in accordance with exemplary embodiments of the present invention can further include a means for producing the image using the at least one tone reproduction curve. In accordance with exemplary embodiments, the image producing means can be any conventional display driver or printer driver, such as the driver 122 of FIG. 1 which can be operated via any conventional user interface 124.

In accordance with alternate embodiments, the look-up table can be encoded with the most desirable tone reproduction curve as the default reproduction curve. In this case, where no modified tone reproduction curve is stored in the imaging device, the most desirable tone reproduction curve will be used to produce output images. In some cases, one tone reproduction curve may be more difficult to implement in an imaging device than another tone reproduction curve. For example, a given tone reproduction curve may include portions having steep slopes which require using a large look-up table to map input values into output values. Accordingly, the present invention can be used to identify a plurality of tone reproductions curves which will produce acceptable results. For example, any tone reproduction curve which intersects the y-axis between the points A'—A' of FIG. 3 can be considered to provide acceptable results. In this case, the tone reproduction curve which intersects the y-axis in the range A'—A', and which is easiest to implement, can be selected as the most desirable tone reproduction curve.

Alternately, it may be desirable to provide a look-up table which includes more than one tone reproduction curve. In the interest of preserving memory space, those skilled in the art will appreciate that where more than one tone reproduction curve is to be stored, it would be desirable to store tone reproduction curves which will produce perceivable differences in the output images. In accordance with exemplary embodiments of the present invention, first and second tone reproduction curves having a predetermined statistical relationship can be stored. For example, a tone reproduction curve which intersects the 95% confidence limits for each of the sample images can be stored (such as curve C3 in FIG. 3). Further, a tone reproduction curve which is outside the 95% tolerance limits for all sample images, can also be stored (such as curve C1 in FIG. 1). As a result, a user can select one tone reproduction curve and be assured that resultant output images will be produced which are visually pleasing. Further, the user can be assured that by selecting the alternate stored tone reproduction curve (such as C1), an additional set of output images can be produced which, for virtually any typical image of the end users' industry, will be perceptively different from the resultant output images produced with the first tone reproduction curve.

Those skilled in the art will appreciate that the foregoing exemplary embodiments of the present invention can be used in the selection of a tone reproduction curve which is used to produce or reproduce black and white images. However, those skilled in the art will also appreciate that exemplary embodiments of the present invention are equally applicable to color imaging. For example, a tone reproduction curve for modifying the lightness of color images which are to be produced can be selected in accordance with the present invention. In this case, sample color images can be mapped into lightness values. Psychophysical data can then be acquired using a set of tone reproduction curves for modifying the lightness values of plural test images. Once a tone reproduction curve has been selected, it can be embedded in a printer or display driver and used to control the lightness of color images which are produced by the printing device or display.

It will be appreciated by those skilled in the art that the present invention can be embodied in other specific forms without departing from the spirit or essential characteristics thereof. The presently disclosed embodiments are therefore considered, in all respects, to be illustrative and not restricted. The scope of the invention is indicated by the appended claims, rather than by the foregoing description and all changes that come within the meaning and range and equivalence thereof are intended to be embraced therein.

What is claimed is:

1. Method for producing an image comprising the steps of:
   deriving and selecting at least a mean tone reproduction curve by statistically analyzing psychophysical data acquired using a first plurality of tone reproduction curves; and
   producing said image using at least the mean tone reproduction curve;
   wherein the psychophysical data comprise observer responses that indicate subjective desirability of test images generated using the first plurality of tone reproduction curves.

2. The method of claim 1, wherein the step of deriving and selecting comprises:
   determining upper and lower confidence limits for the observer responses with respect to each test image; and
   selecting as the mean tone reproduction curve, a tone reproduction curve that lies between the upper and lower confidence limits for each of the for the observer responses for each test image.

3. Method according to claim 1, wherein said step of deriving a mean tone reproduction curve further includes steps of:
   analyzing said psychophysical data using a maximum likelihood model which relates the psychophysical data to occurrence probability estimates; and
   assessing a fit of the psychophysical data to a cumulative normal distribution.

4. Method according to claim 3, wherein said step of deriving a mean tone reproduction curve further includes a step of:
   estimating a tolerance of the psychophysical data using a median tolerance.

5. Method according to claim 4, wherein said step of deriving a mean tone reproduction curve further includes a step of:
   estimating an uncertainty of the tolerance using fiducial limits.

6. Method according to claim 1, wherein said step of selecting further includes steps of:
   choosing said plurality of tone reproduction curves;
   generating a set of test images using said plurality of tone reproduction curves; and
   performing a psychophysical analysis of said set of test images to provide said psychophysical data.

7. Method according to claim 6, wherein said step of choosing said plurality of tone reproduction curves further includes steps of:
   selecting a transfer function as a first tone reproduction curve; and
   varying a parameter of the transfer function to generate at least one additional tone reproduction curve.

8. Method according to claim 6, wherein said step of choosing said plurality of tone reproduction curves further includes steps of;
   selecting a first transfer function as a first tone reproduction curve; and
   selecting a second transfer function, having a mathematical construct which differs from that of said first transfer function as a second tone reproduction curve.

9. Method according to claim 6, wherein said step of generating a set of test images further includes steps of:
   identifying sample images; and
   reproducing each of said sample images as said test images using each of said plurality of tone reproduction curves.

10. Method according to claim 6, wherein said step of performing a psychophysical analysis further includes the steps of:
    comparing said test images with one another to obtain said psychophysical data.

11. Method according to claim 10, wherein said step of performing a psychophysical analysis further includes a step of:
    comparing said test images using a forced choice paired comparison.

12. Method according to claim 1, wherein said step of producing said image further includes a step of:
    coding said at least one tone reproduction curve into a printer driver.

13. Method according to claim 1, wherein said step of producing said image further includes a step of:
  coding said at least one tone reproduction curve into a display driver.

14. Method for producing an image comprising the steps of:
  generating a plurality of tone reproduction curves having a range of parameter values;
  acquiring psychophysical data using the plurality of tone reproduction curves;
  selecting at least one tone reproduction curve from the plurality of tone reproduction curves by statistically analyzing the psychophysical data;
  determining when a parameter of the selected at least one tone reproduction curve is at an extreme of the range of parameter values;
  repeating said steps of generating, acquiring, selecting and determining, wherein each plurality of tone reproduction curves has a different range of parameter values, until the parameter of said selected at least one tone reproduction curve is not at an extreme of the range of parameter values; and
  producing said image using the selected at least one tone reproduction curve having the parameter not at the extreme of the range of parameter values.

15. Apparatus for producing an image comprising:
  means for deriving a mean tone reproduction curve based on statistical analysis of psychophysical data;
  means for storing at least one tone reproduction curve having a parameter based on statistical analysis of psychophysical data, including the mean tone reproduction curve; and
  means for producing an image using said mean tone reproduction curve;
  wherein the psychophysical data comprise observer responses that indicate subjective desirability of test images generated using the first plurality of tone reproduction curves.

16. Apparatus according to claim 15, wherein said storing means includes:
  a look-up table of a printer driver.

17. Apparatus according to claim 15, wherein said storing means includes:
  a look-up table of a display driver.

18. Apparatus according to claim 15, wherein said storing means includes:
  at least first and second tone reproduction curves, said first and second tone reproduction curves having a predetermined statistical relationship.

19. The method of claim 2, wherein the selected mean tone reproduction curve is one of the first plurality of tone reproduction curves.

20. The method of claim 2, wherein the selected mean tone reproduction curve is a weighted average of two of the first plurality of tone reproduction curves.

21. The method of claim 1, wherein the observer responses include rating values from a desirability rating scale indicating a desirability of each of the test images.

22. The apparatus of claim 15, wherein the observer responses include rating values from a desirability rating scale indicating a desirability of each of the test images.

23. The apparatus of claim 15, wherein the means for deriving comprises upper and lower confidence limits for the observer responses with respect to each test image, and wherein the mean tone reproduction curve lies between the upper and lower confidence limits for each of the for the observer responses for each test image.

24. The apparatus of claim 23, wherein the selected mean tone reproduction curve is one of the first plurality of tone reproduction curves.

25. The apparatus of claim 24, wherein the selected mean tone reproduction curve is a weighted average of two of the first plurality of tone reproduction curves.

26. A computer readable medium including software for causing a computer to perform the steps of:
  deriving and selecting at least a mean tone reproduction curve by statistically analyzing psychophysical data acquired using a first plurality of tone reproduction curves; and
  producing said image using at least the mean tone reproduction curve;
  wherein the psychophysical data comprise observer responses that indicate subjective desirability of test images generated using the first plurality of tone reproduction curves.

27. The computer readable medium of claim 26, wherein the observer responses include rating values from a desirability rating scale indicating a desirability of each of the test images.

28. The computer readable medium of claim 26, wherein the step of deriving and selecting comprises:
  determining upper and lower confidence limits for the observer responses with respect to each test image; and
  selecting as the mean tone reproduction curve, a tone reproduction curve that lies between the upper and lower confidence limits for each of the for the observer responses for each test image.

29. The computer readable medium of claim 28, wherein the selected mean tone reproduction curve is one of the first plurality of tone reproduction curves.

30. The computer readable medium of claim 28, wherein the selected mean tone reproduction curve is a weighted average of two of the first plurality of tone reproduction curves.

* * * * *

UNITED STATES PATENT AND TRADEMARK OFFICE
CERTIFICATE OF CORRECTION

PATENT NO. : 6,345,128 B1
DATED : February 5, 2002
INVENTOR(S) : Michael Stokes

It is certified that error appears in the above-identified patent and that said Letters Patent is hereby corrected as shown below:

<u>Column 12,</u>
Line 3, the phrase "for each of the for the observer" should read -- for each of the observer --.

<u>Column 14,</u>
Lines 14 and 45, the phrase "for each of the for the observer" should read -- for each of the observer --.

Signed and Sealed this

Eighteenth Day of June, 2002

*Attest:*

JAMES E. ROGAN
*Attesting Officer*   *Director of the United States Patent and Trademark Office*